(12) United States Patent
Tewell (10) Patent No.: US 6,292,097 B1
(45) Date of Patent: *Sep. 18, 2001

(54) VARIABLE MODE VISUAL ALERT WARNING SYSTEM

(75) Inventor: Tony J. Tewell, Nampa, ID (US)

(73) Assignee: Electronic Controls Company, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,257

(22) Filed: Aug. 10, 1999

(51) Int. Cl.$^7$ ........................................ B60Q 1/52
(52) U.S. Cl. ..................... 340/471; 340/332; 315/83; 362/208
(58) Field of Search ..................... 340/471, 331, 340/332, 691.4, 691.1; 315/83; 362/208

(56) References Cited

U.S. PATENT DOCUMENTS

| | | | |
|---|---|---|---|
| 3,705,401 | * 12/1972 | Scot | 340/412 |
| 4,117,454 | * 9/1978 | Fabry et al. | 340/331 |
| 5,477,208 | * 12/1995 | Henderson et al. | 340/471 |
| 5,552,767 | * 9/1996 | Toman | 340/540 |
| 5,559,492 | * 9/1996 | Stewart et al. | 340/331 |
| 5,602,522 | 2/1997 | Pacelli | 340/331 |
| 5,644,291 | * 7/1997 | Jozwik | 340/331 |
| 5,872,511 | * 2/1999 | Ohkuma | 340/471 |
| 5,939,979 | * 8/1999 | Lee | 340/479 |
| 6,014,596 | * 1/2000 | Bess et al. | 340/468 |

* cited by examiner

Primary Examiner—Jeffery Hofsass
Assistant Examiner—Daniel Previl
(74) Attorney, Agent, or Firm—Joseph W. Holland (57) ABSTRACT

A visual alert system including at least two visual alert devices conductively connected to form an array. Each visual alert device includes a control circuit. The control circuits of the visual alert devices are connected by a flash mode interconnect line. The control circuits, thus interconnected are capable of sensing changes in voltage between the first and second control circuits across the flash mode interconnect line and therefore between the first and second visual alert devices. The visual alert devices, through their respective control circuits, may be programmed and selectively switched to operate in a variety of flash modes including an alternating mode or a synchronous mode.

4 Claims, 6 Drawing Sheets

VARIABLE MODE VISUAL ALERT WARNING SYSTEM

BACKGROUND OF THE INVENTION

1. Technical Field

The present invention relates generally to warning or hazard alert lighting systems and more particularly to a multiple visual alert device having variable mode operational capability.

2. Background

A wide variety of equipment, including mobile emergency, maintenance and law enforcement vehicles, employ a variety of signaling devices, both audible and visual. Visual alert devices commonly used in connection with these types of applications include flashing or flash simulating devices. Flashing devices may include strobe lights, rotating halogen devices, rotating sealed beam devices, flashing incandescent devices and devices which may include an array of light emitting diodes (LED).

The prior art recognizes generally the benefit in providing strobe pulse control, see Pacelli, U.S. Pat. No. 5,602,522, Visual Signaling System. In particular, the prior art recognizes that providing for a constant flash rate for strobe lights connected in an array may be of benefit. According to the prior art, constant flash rate for strobe lights has been achieved utilizing a single control circuit electrically connected to more than one strobe which signals each strobe individually to discharge simultaneously and at a constant rate. This type of system has a distinct disadvantage of relying on an additional and external component to trigger and therefore control strobe operation.

It may be desirable to provide a visual alert system that has either an alternating mode operational capability or a synchronous mode operational capability or in the alternative, both an alternating mode operational capability and a synchronous mode operational capability. It may also be desirable to provide either an alternating mode operational capability or a synchronous mode operational capability for strobe lights or other visual alert devices which are connected in an array which eliminates the need for a separate control device to operate and control the array of visual alert devices. In addition, it may be desirable to provide a visual alert system that has both an alternating mode operational capability and a synchronous mode operational capability which eliminates the need for a separate control device to operate and control an array of visual alert devices.

SUMMARY OF THE INVENTION

Accordingly, these and other objectives are achieved by a visual alert system having variable mode operational capability that includes two or more visual alert devices electrically interconnected to form an array. By variable mode it is meant alternating mode, both single and multiple pulse, synchronous mode both single and multiple pulse as well as the variations that may be achieved employing the present invention.

In one embodiment of the invention, the array may include a first visual alert device including a first control circuit and a second visual alert device including a second control circuit. The first and second control circuits are interconnected by way of a flash mode interconnect line. The first and second control circuits, thus interconnected are capable of sensing changes in voltage between the first and second strobe control circuits and therefore between the first and second visual alert devices.

In one embodiment of the invention, the first visual alert device includes a first strobe and a second strobe. In this embodiment of the invention, the first visual alert device includes a first strobe control circuit and the second visual alert device includes a second strobe control circuit. The first strobe control circuit and the second strobe control circuit, specifically, a first strobe control circuit microcontroller and a second strobe control circuit microcontroller, are interconnected by a flash mode interconnect line which, in the case of alternating mode operation is designated as an alternating flash mode interconnect line.

In one embodiment of the invention, the visual alert system the system operates in an alternating mode. In this embodiment of the invention, the visual first and second visual alert devices flash in a sequential manner wherein a first visual alert device is energized or discharges, followed by an interval between the energization or discharge of the first visual alert device and the second first visual alert device, followed by the energization or discharge of a second visual alert device. In the alternating mode the first and second visual alert devices may alternate flashing in single as well as multiple flash mode i.e. dual, quad, etc.

In the alternating mode operation, whenever either strobe flashes, it pulls the voltage across the alternating flash mode interconnect line low. Upon power up, each strobe begins operating norm ally, pulling the alternating flash mode interconnect line low when flashing. At this point, both the first and second strobe lights are flashing simultaneously. When the strobes are not flashing, their respective strobe control circuits monitor the alternating flash mode interconnect line to see if it gets pulled low. After an unspecified interval, the strobes will be slightly out of sequence. The first of the two strobes to detect a drop in voltage across the alternating flash mode interconnect line assumes operation as a slave strobe, with the other serving as a master strobe. The slave strobe monitors the alternating flash mode interconnect line for a preselected higher value indicating that the master strobe has completed its flash or flash sequence. Before discharging, the slave strobe delays a preselected delay interval depending upon the operational characteristics of the particular preselected flash program, i.e. single, dual or quad mode. During the slave strobe's flashing sequence, the master strobe monitors the alternating flash mode interconnect line for a preselected higher value indicating that the slave strobe has completed its flash or flash sequence. Flash intervals and delay intervals may be timed in incremental intervals.

The master strobe delays a preselected delay interval, once again depending upon the operational characteristics of the particular preselected flash program, before energizing. The system thereby achieves alternating flash mode and remains in that mode and the process sequence is repeated until the system power is switched off or the operational mode is changed.

In an alternate embodiment of the invention, the visual alert system the system operates in a synchronous mode. In this embodiment of the invention, the first strobe control circuit and the second strobe control circuit are interconnected by the flash mode interconnect line which in the case of synchronous mode operation is designated as a synchronous flash mode interconnect line. Whenever either strobe flashes, it pulls the voltage across the synchronous flash mode interconnect line low. In the case of synchronous mode operation, the first and second visual alert devices flash in a substantially synchronous mode wherein a first visual alert device is energized or discharges, in some cases more than once, followed by the substantially synchronous energization or discharge of a second visual alert device, followed by a dead interval between energization or discharge of the first and second visual alert devices. In the synchronous mode the first and second visual alert devices may flash in single as well as multiple flash mode, i.e. dual, quad, etc.

In the synchronous mode, upon power up, each strobe begins operating normally, pulling the synchronous flash mode interconnect line low when flashing. At this point, both the first and second strobe lights are flashing simultaneously. When they aren't flashing, their respective strobe control circuits monitor the synchronous mode interconnect line to detect if it gets pulled low. After a few seconds of operation, the strobes will be slightly out of sequence, and a second strobe will detect that the first strobe is pulling the line low. When the predefined low voltage is detected by the second strobe control circuit across the synchronous flash mode interconnect line indicating that the first strobe has discharged before the preselected dead interval has lapsed, the second strobe control circuit jumps to the beginning of its flash sequence and triggers the second strobe. The effect is that the second strobe discharges at a very short time following the discharge of the first strobe, creating the impression of synchronous mode operation. If a low voltage is not detected across the synchronous flash mode interconnect line prior to the end of the dead interval, both strobe control circuits will trigger a flash at the preselected time. The system thereby achieves synchronous flash mode and remains in that mode until the system power is switched off or the operational mode is changed. The strobe may be programmed to flash in a single or multiple mode, i.e. dual or quad etc.

In one embodiment of the invention, the visual alert system is capable of operation in either alternate or synchronous mode operation.

In an alternate embodiment of the invention, the array may include more than two interconnected visual alert devices. Various patterns may be achieved in this manner. For instance, first and second strobe lights may be interconnected for synchronous flash mode. Similarly, third and fourth strobe lights may be interconnected for synchronous flash mode. With the addition of a third interconnect line, for instance an alternating flash mode interconnect line between second and third strobe lights, a pattern, wherein first and second strobes flash in synchronous mode operation with respect to one another while third and fourth strobes flash in synchronous mode operation with respect to one another is achieved. However, first and second strobes flash in an alternating mode with respect to third and fourth strobes. In this manner a wide variety of patterns may be created employing a number of alert devices restricted only by the limitations of the electrical system as a whole.

Other advantages will become apparent to those skilled in the art from the following detailed description read in conjunction with the appended claims.

DETAILED DESCRIPTION OF THE INVENTION

Figure 1:
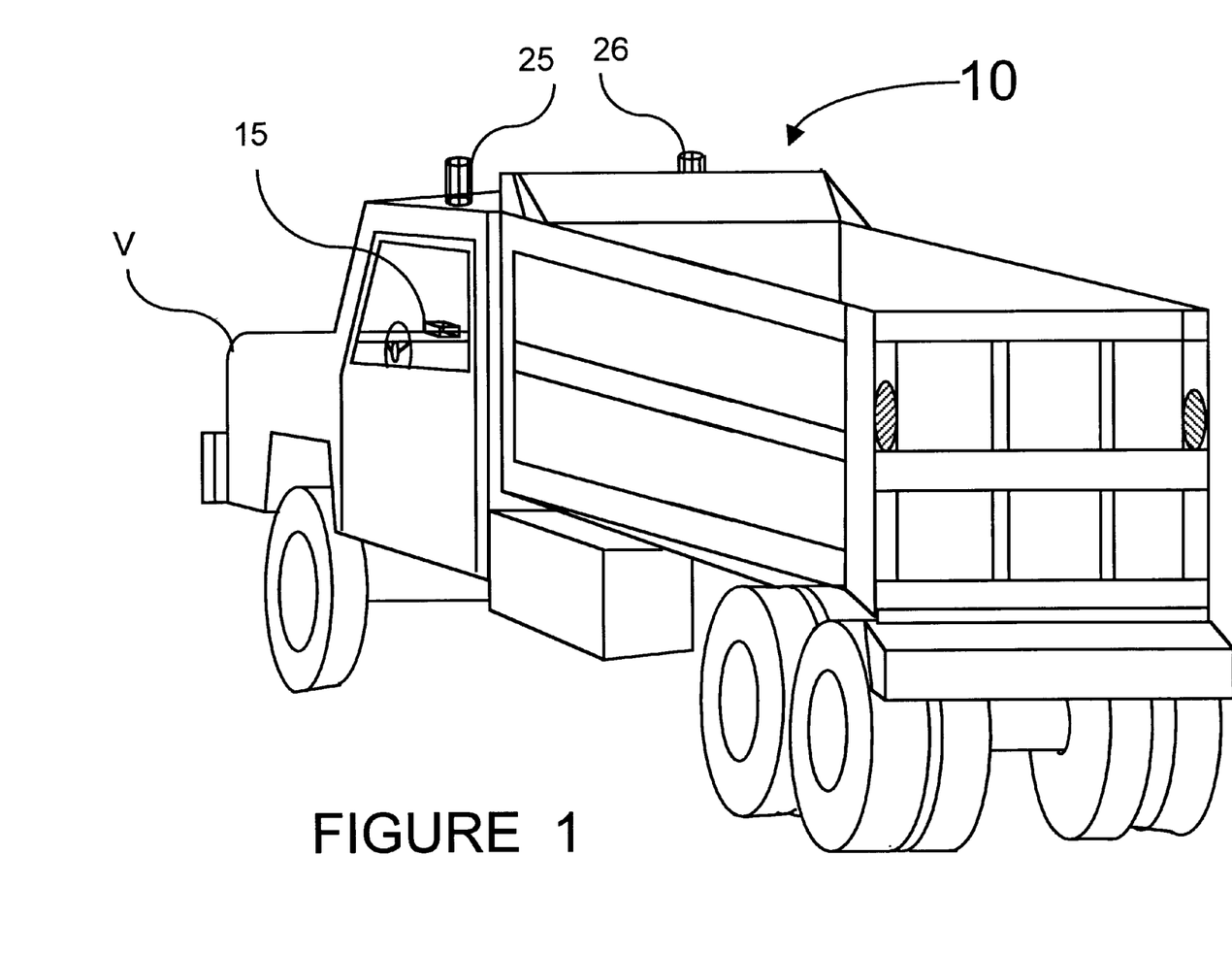
FIG. 1 is a perspective representational view of a vehicle employing a variable mode visual alert system according to the present invention.

FIG. 1 shows maintenance vehicle V including variable mode visual alert system 10. In the embodiment of the invention shown in FIG. 1, variable mode visual alert system 10 includes strobe lights 25 and 26 mounted atop the cab of maintenance vehicle V. The system also may also include switching and control circuit 15, in this case mounted within the cab of maintenance vehicle V.

Figure 2:
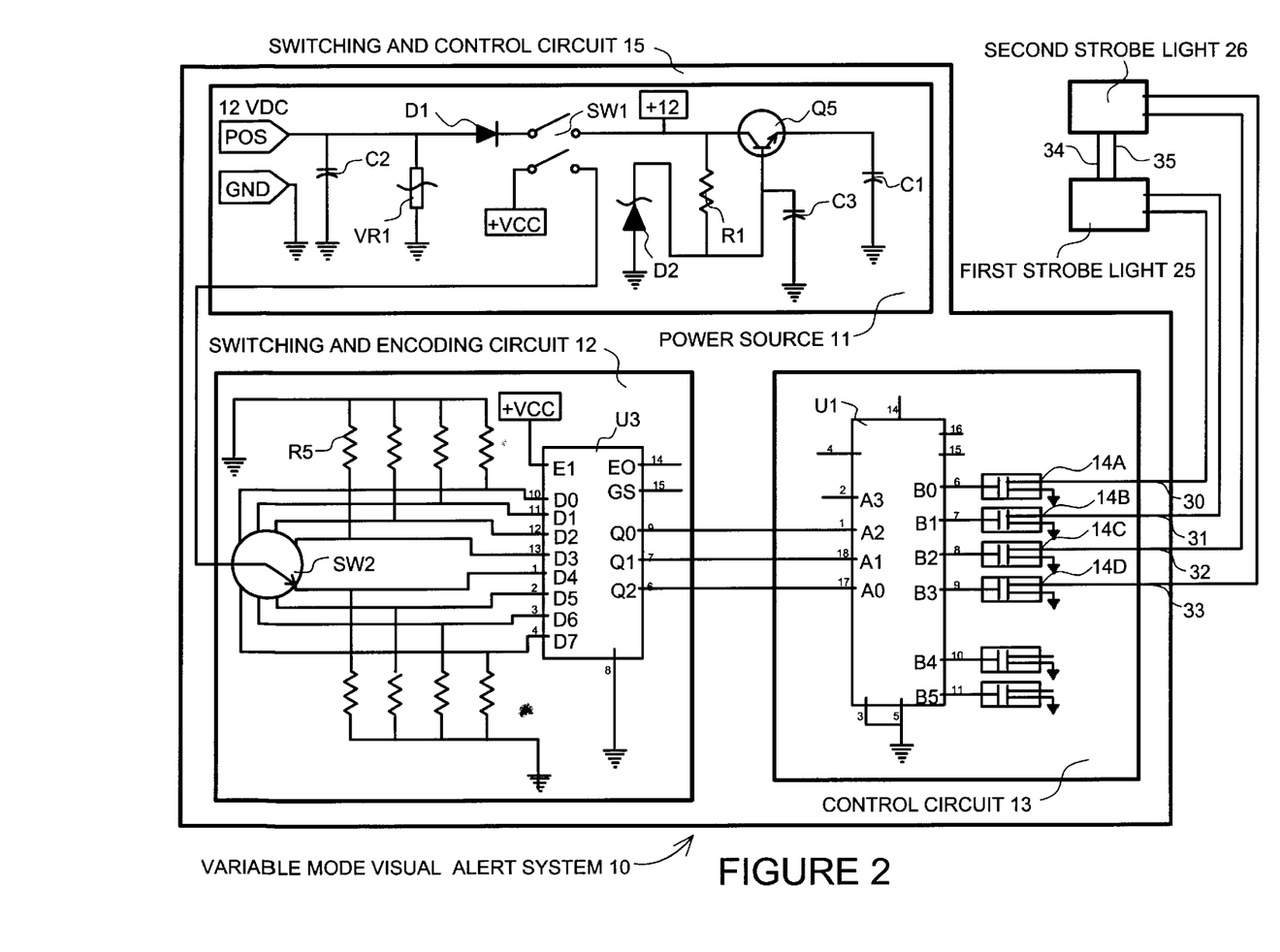
FIG. 2 is a schematic representation of a variable mode visual alert system according to the present invention.

FIG. 2 shows variable mode visual alert system 10 including power source 11 which provides switchable electrical current through switch SW1 to system components including switching and encoding circuit 12 and control circuit 13. Power source 11 is conductively connected to switching and control circuit 15. Switching and control circuit 15 includes control circuit 13 and switching and encoding circuit 12. First strobe light 25 is connected to control circuit 13 by first conductor 30 and second conductor 31 through output switches 14A and 14B. Second strobe light 26 is similarly shown connected to control circuit 13 by third conductor 32 and fourth conductor 33 through output switches 14C and 14D. First strobe light 25 and second strobe light 26 are conductively connected by alternating flash mode interconnect line 34 and synchronous flash mode interconnect line 35.

Switching and encoding circuit 12 includes encoder U3 connected to switch SW2. Encoder U3 in the embodiment shown includes an integrated circuit manufactured by the Motorola Company and identified as part number MC14532B. SW2 is conductively connected to the plurality of input pins of encoder U3 and permits the user of the system to switch the device between a plurality of preprogrammed flash modes. The output pins of encoder U3 are conductively connected to microcontroller U1 of control circuit 13 as shown. Microcontroller U1 converts the input signal from encoder U3 to activate the system through output switches shown generally, 14A through 14D to activate and operate the system in a variety of preprogrammed flash modes. Microcontroller U1, in the embodiment shown, includes an integrated circuit manufactured by the Microchip Company and identified as part number PIC16C54.

Figure 3:
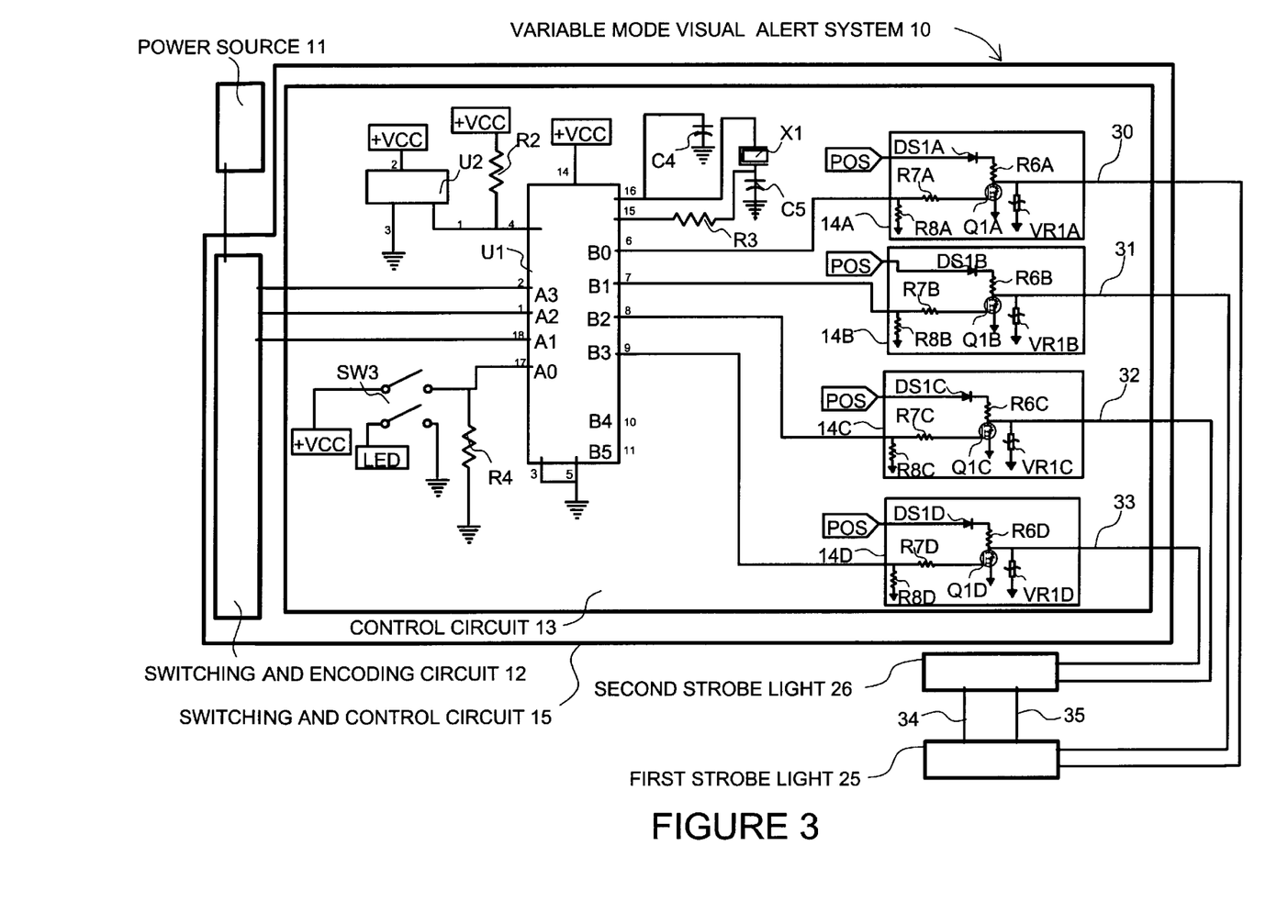
FIG. 3 is a schematic representation of a variable mode visual alert system according to the present invention.

Referring to FIG. 3, variable mode visual alert system 10 is shown including power source 11 connected to switching and control circuit 15. Switching and control circuit 15 includes control circuit 13 conductively connected to switching and encoding circuit 12. As shown in FIG. 3, control circuit 13 includes microcontroller U1 having a plurality of input pins which are connected to switching and encoding circuit 12. The output pins of microcontroller U1 are connected to a plurality of output switches shown generally as output switch 14A, output switch 14B, output switch 14C and 14D. FIG. 3 shows variable mode visual alert system 10 including first strobe light 25 connected to output switch 14A by first conductor 30 and to output switch 14B by second conductor 31. Similarly, second strobe light 26 is connected to output switch 14C by third conductor 32 and to output switch 14D by fourth conductor 33.

Each of the output switches 14A, 14B, 14C and 14D include transistors Q1A, Q1B, Q1C and Q1D respectively, which provide switching of low voltage power to first strobe light 25 and second strobe light 26.

Figure 4:
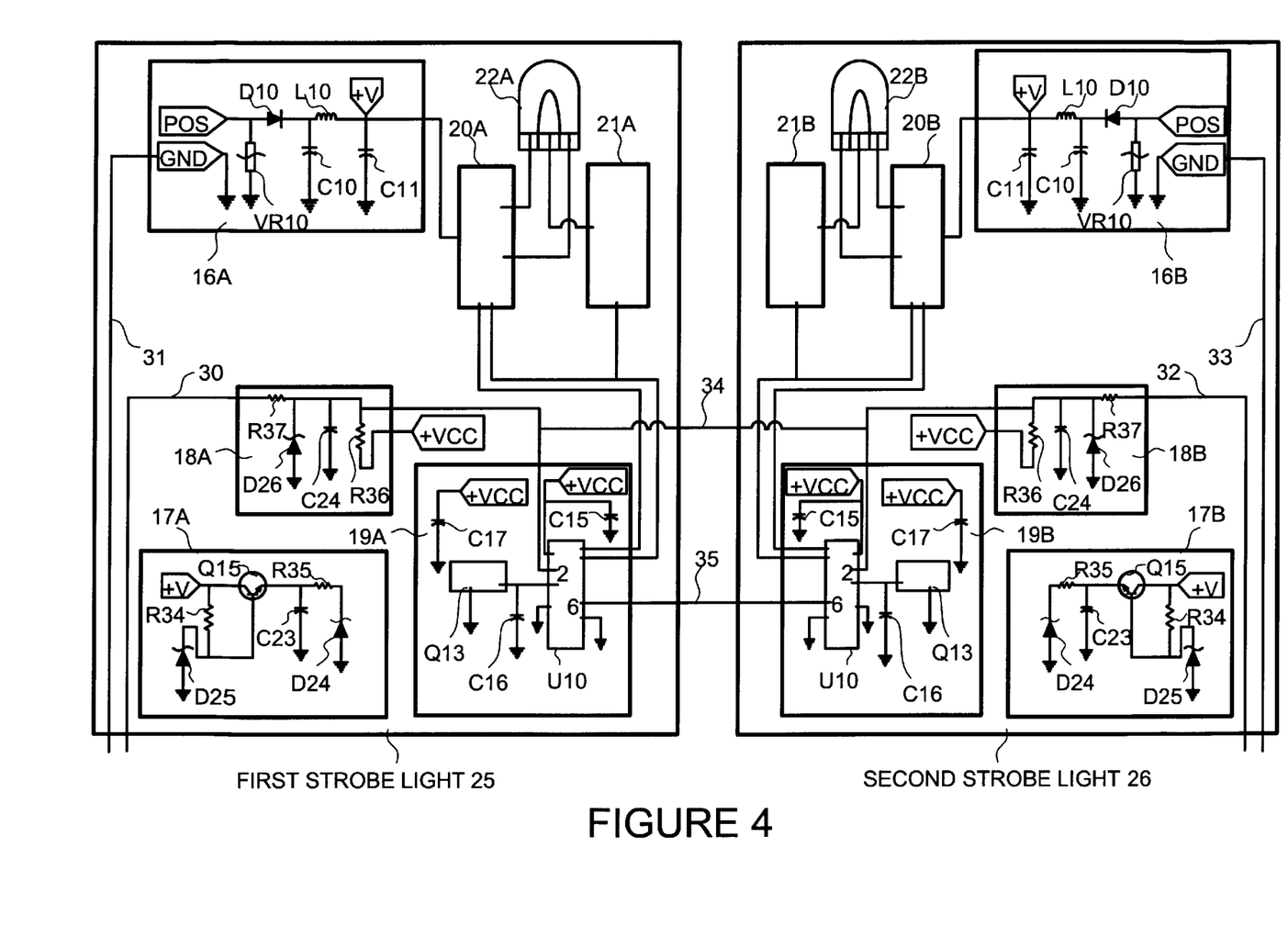
FIG. 4 is a schematic representation of first and second strobe lights employed in the present invention.

FIG. 4 is a schematic representation showing first strobe light 25 and second strobe light 26. First strobe light 25 is shown including first power input circuit 16A, first low voltage power supply circuit 17A, first flash mode input circuit 18A, first strobe control circuit 19A, first charging power supply circuit 20A and first trigger circuit 21A. First conductor 30 is conductively connected to first charging power supply circuit 20A and first trigger circuit 21A through first flash mode input circuit 18A and first strobe control circuit 19A. Similarly, second conductor 31 is conductively connected to first charging power supply circuit 20A through first power input circuit 16A. First flash tube 22A is conductively connected to first charging power supply circuit 20A and first trigger circuit 21A.

Second strobe light 26 is shown including second power input circuit 16B, second power supply circuit 17B, second flash mode input circuit 18B, second strobe control circuit 19B, second charging power supply circuit 20B and second trigger circuit 21B. Third conductor 32 is conductively connected to second charging power supply circuit 20B and second trigger circuit 21B through second flash mode input circuit 18B and second strobe control circuit 19B. Similarly, fourth conductor 33 is conductively connected to second charging power supply circuit 20B through second power input circuit 16B. Second flash tube 22B is conductively connected to second charging power supply circuit 20B and second trigger circuit 21B.

FIG. 4 also shows first strobe control circuit 19A and second strobe control circuit 19B conductively connected by alternating flash mode interconnect line 34 and synchronous flash mode interconnect line 35. More particularly, the first end of alternating flash mode interconnect line 34 is shown connected at pin 2 of microcontroller U10 of first strobe control circuit 19A and the second end of alternating flash mode interconnect line 34 is shown connected at pin 2 of microcontroller U10 of second strobe control circuit 19B. Similarly, the first end of synchronous flash mode interconnect line 35 is shown connected at pin 6 of microcontroller U10 of first strobe control circuit 19A and the second end of synchronous flash mode interconnect line 35 is shown connected at pin 6 of microcontroller U10 of second strobe control circuit 19B. Microcontroller U10, in the embodiment shown, includes an integrated circuit manufactured by the Microchip Company and identified as part number PIC12C508.

Figure 5A:
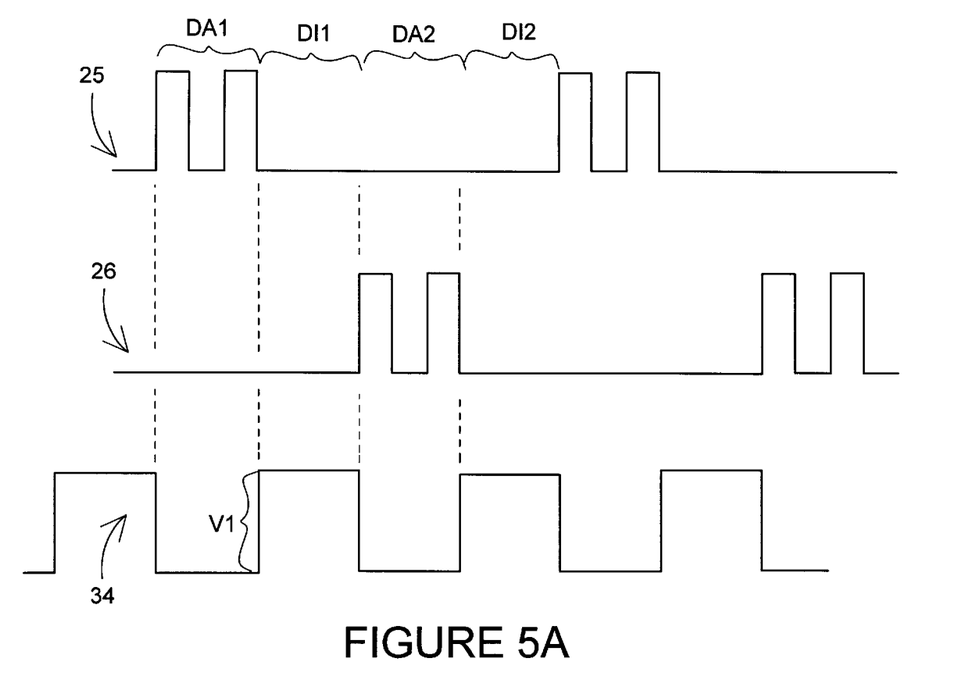
FIG. 5A is a graphic representation of pulse timing for one embodiment of the present invention operating in dual alternating mode.

FIG. 5A is a graphic representation of pulse timing for an embodiment of the present invention operating in dual flash alternating mode. FIG. 5A shows relative pulse timing for first strobe light 25 and second strobe light 26 and corresponding relative voltage across alternating flash mode interconnect line 34. It may be noted that at the termination of flash interval DA1 of first strobe light 25, voltage rises at V1 to a preselected higher voltage across alternating flash mode interconnect line 34. Timing of delay interval DA1 begins for the sequential flash of second strobe light 26 in flash interval DA2. Flash interval DA2 is followed by delay interval DI2 and so on. In this embodiment of the invention, flash interval DA1 and flash interval DA2 both equal 210 ms±50 ms and delay interval DI equals 180 ms±25 ms. Flash interval DA1 and flash interval DA2 and delay intervals DI1 and DI2 may be varied in intervals of 30 ms.

Figure 5B:
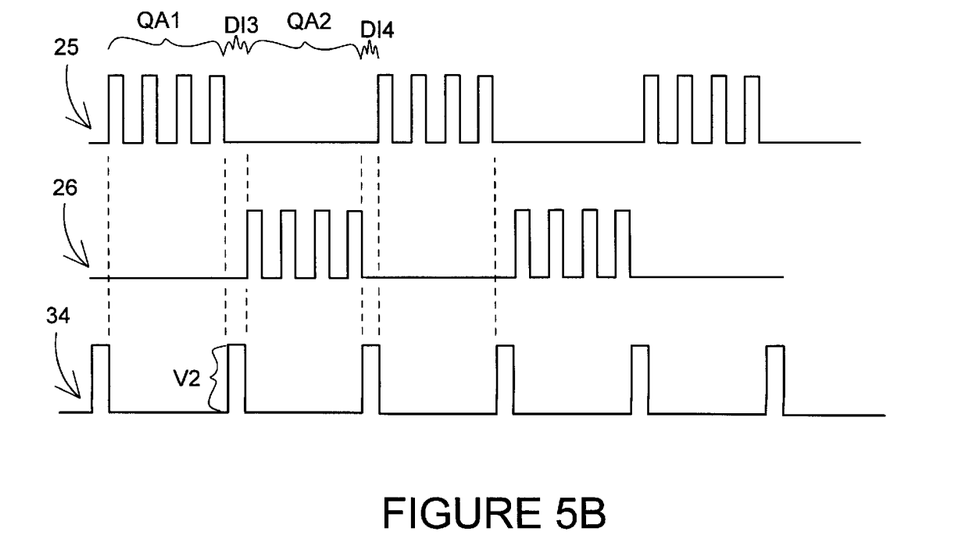
FIG. 5B is a graphic representation of pulse timing for one embodiment of the present invention operating in quad alternating mode.

FIG. 5B is a graphic representation of pulse timing for one embodiment of the present invention operating in quad flash alternating mode. FIG. 5B shows relative pulse timing for first strobe light 25 and second strobe light 26 and corresponding voltage across alternating flash mode interconnect line 34. It may be noted that at the termination of flash interval QA1 of first strobe light 25, voltage rises at V2 to a preselected higher voltage across alternating flash mode interconnect line 34. Timing of delay interval DI3 begins for the sequential flash of second strobe light 26 in flash interval QA2. Flash interval QA2 is followed by delay interval DI4 and so on. In this embodiment of the invention, flash interval QA1 and flash interval QA2 both equal 420 ms and delay interval DI equals 60 ms. Flash interval QA1 and flash interval QA2 and delay intervals DI3 and DI4 may be varied in intervals of 30 ms.

Figure 6A:
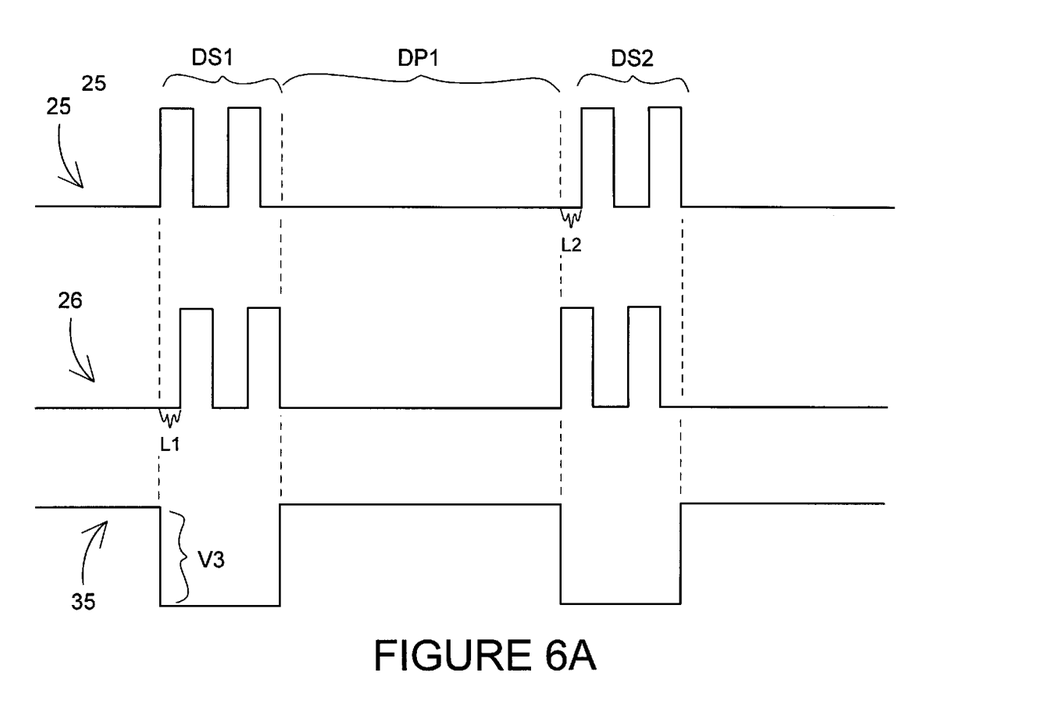
FIG. 6A is a graphic representation of pulse timing for one embodiment of the present invention operating in dual synchronous mode.

FIG. 6A is a graphic representation of pulse timing for one embodiment of the present invention operating in dual synchronous mode. FIG. 6A shows relative pulse timing for first strobe light 25 and second strobe light 26 and corresponding voltage across synchronous flash mode interconnect line 35. It may be noted that when voltage V3 drops to a preselected low voltage level as a result of the discharge of first strobe light 25 in flash interval DS1, the discharge of second strobe light 26 follows at an interval indicated by lapse L1. Since lapse L1 is measured in microseconds the apparent visual effect is one of synchronous flash. FIG. 6A also illustrates the concept that either first strobe light 25 or second strobe light 26 may discharge first as in the case of the second impulse DS2 which is led by the discharge of second strobe light 26 followed at an interval indicated by lapse L2 by the discharge of first strobe light 25. In this embodiment of the invention, DS1 and DS2 both equal 210 ms±60 ms and dead period DP1 between flashes equals equal 540 ms±60 ms. Flash DS1 and DS2 and dead period DP1 may be varied in intervals of 30 ms.

Figure 6B:
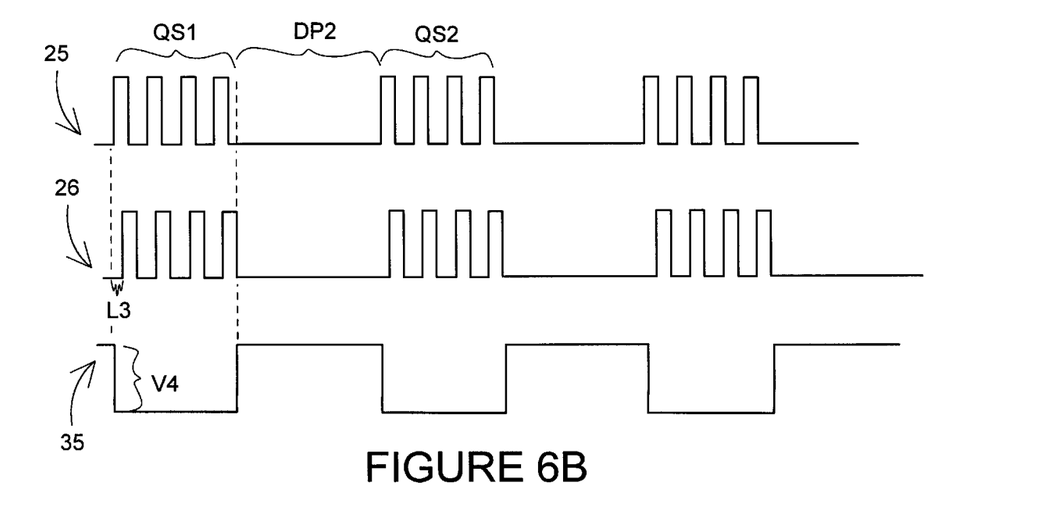
FIG. 6B is a graphic representation of pulse timing for one embodiment of the present invention operating in quad synchronous mode.

FIG. 6B is a graphic representation of pulse timing for one embodiment of the present invention operating in quad synchronous mode. FIG. 6B shows relative pulse timing for first strobe light 25 and second strobe light 26 and corresponding voltage across synchronous flash mode interconnect line 35. It may be noted that when voltage V4 drops to a preselected low voltage level as a result of the discharge of first strobe light 25 in flash interval QS1, the discharge of second strobe light 26 follows at an interval indicated by lapse L3. In this embodiment of the invention, QS1 and QS2 both equal 420 ms±60 ms and dead period DP2 between flashes equals equal 540 ms±60 ms. Flash QS1 and QS2 and dead period DP2 may be varied in intervals of 30 ms.

The following is an identification of various components of the circuits described herein, it being understood that specified components may be varied and/or replaced by other suitable components depending upon the particular application, and that any such replacement or substitution still falls within the scope of the present invention.

Power source 11 as shown in FIG. 2 includes the components:

| capacitor C1 | 100μF 50V |
|---|---|
| capacitor C2 | .1μF 400V |
| capacitor C3 | 10μF 50V |
| diode D1 | 1N4006, 1A, 800V |
| diode D2 | 1N5233 zener, 6V |
| resistor R1 | 2K 2W |
| transistor Q5 | MPSW 42 |
| varistor VR1 | 47V |

Switching and encoding circuit 12 as shown in FIG. 2 includes the components:

| encoder U3 | MC14532B |
|---|---|
| resistor R5 | 10K |

Control circuit 13 as shown in FIG. 3 includes the components:

| microcontroller U1 | PIC16C54 |
|---|---|
| reset circuit U2 | MC33064 |
| capacitor C4 | 18pf |
| capacitor C5 | 18pf |
| resistor R2 | 10K |
| resistor R3 | 150 |
| resistor R4 | 10K |
| crystal X1 | 4.0 MHZ |

Output switch 14A, which is typical of output switch 14B, 14C and 14D as shown in FIG. 3 includes the components:

| resistor R6A | 1K |
|---|---|
| resistor R7A | 1K |
| resistor R8A | 10K |
| transistor Q1A | power mosfet, 60V |
| varistor VR1A | 22V |

First power input 16A, as shown in FIG. 4 and which is typical of second power input 16B, includes the components:

| capacitor C10 | .01 1K |
|---|---|
| capacitor C11 | 680 μF 50V |
| inductor L10 | 100μH |
| diode D10 | FR605 |
| varistor VR10 | 68V |

First low voltage power supply 17A, which is typical of second low voltage power supply 17B, as shown in FIG. 4 includes the components:

| capacitor C23 | 10μF 50V |
|---|---|
| diode D24 | 1N5231B zener 5.1V |
| diode D25 | 1N4741A zener 11V |

-continued

| transistor Q15 | MPSW42 |
|---|---|
| resistor R34 | 3.9K 1W |
| resistor R35 | 1K |

First trigger input 18A, which is typical of second trigger input 18B, as shown in FIG. 4 includes the components:

| resistor R36 | 200K |
|---|---|
| resistor R37 | 35.7K |
| diode D26 | 1N5231B zener 5.1V |
| capacitor C24 | .01 μF |

First strobe control circuit 19A, which is typical of second strobe control circuit 19B, as shown in FIG. 4 includes the components:

| capacitor C15 | 1μF |
|---|---|
| capacitor C16 | 1μF |
| capacitor C17 | 1μF |
| microcontroller U10 | P1C12C508 |
| reset circuit Q13 | MC33064P |

Circuit design for first charging power supply circuit 20A, which is typical of second charging power supply circuit 20B, is well known to those skilled in the art. Similarly, circuit design for first trigger circuit 21A, which is typical of second trigger circuit 21B, is well known to those skilled in the art.

While this invention has been described with reference to the described embodiments, this is not meant to be construed in a limiting sense. Various modifications to the described embodiments, as well as additional embodiments of the invention, will be apparent to persons skilled in the art upon reference to this description, the drawings and the appended claims. It is therefore contemplated that the appended claims will cover any such modifications or embodiments as fall within the true scope of the invention.

I claim:

1. A visual alert system comprising:

a switching and control circuit including a switching and encoding circuit conductively connected to a power source and a control circuit conductively connected to the switching and encoding circuit;

a first strobe light including a first strobe control circuit conductively connectable to the power source, a first power input conductively connected to the control circuit, a first trigger input conductively connected to the control circuit and the first strobe control circuit, a first charging power supply circuit conductively connected to the first strobe control circuit, a first trigger circuit conductively connected to the first strobe control circuit and a first flash tube conductively connected to the first charging power supply circuit and the first trigger circuit;

an alternate flash mode interconnect line having a first end and a second end, the first end of the alternate flash mode interconnect line conductively connected to the first strobe control circuit;

a synchronous flash mode interconnect line having a first end and a second end, the first end of the synchronous flash mode interconnect line conductively connected to the first strobe control circuit;

a second strobe light including a second strobe control circuit conductively connectable to the power source, a second power input conductively connected to the control circuit, a second trigger input conductively connected to the control circuit and the second strobe control circuit, a second charging power supply circuit conductively connected to the second strobe control circuit, a second trigger circuit conductively connected to the second strobe control circuit and a second flash tube conductively connected to the second charging power supply circuit and the second trigger circuit, the second end of the alternate flash mode interconnect line conductively connected to the second strobe control circuit and the second end of the synchronous flash mode interconnect line conductively connected to the second strobe control circuit.

2. A visual alert system comprising:

a power source;

a switching and control circuit including a switching and encoding circuit conductively connected to the power source;

a control circuit conductively connected to the switching and encoding circuit;

a first strobe light including a first strobe control circuit conductively connectable to the power source and the control circuit;

a first charging power surply circuit conductively connected to the first strobe control circuit;

a first trigger circuit conductively connected to the first strobe control circuit;

a first flash tube conductively connected to the first charging power supply circuit and the first trigger circuit;

an alternate flash mode interconnect line, a first end of the alternate flash mode interconnect line conductively connected to the first strobe control circuit;

a synchronous flash mode interconnect line, a first end of the synchronous flash mode interconnect line conductively connected to the first strobe control circuit;

a second strobe light including a second strobe control circuit conductively connectable to the power source and the control circuit;

a second charging power supply circuit conductively connected to the second strobe control circuit;

a second trigger circuit conductively connected to the second strobe control circuit;

a second flash tube conductively connected to the second charging power supply circuit and the second trigger circuit;

a second end of the alternate flash mode interconnect line conductively connected to the second strobe control circuit; and a second end of the synchronous flash mode interconnect line conductively connected to the second strobe control circuit.

3. A visual alert system comprising:

a switching and control circuit including a switching and encoding circuit conductively connected to a power source and a control circuit conductively connected to the switching and encoding circuit;

a first strobe light including a first strobe control circuit conductively connectable to the power source, a first power input conductively connected to the control circuit, a first trigger input conductively connected to the control circuit and the first strobe control circuit, a first charging power supply circuit conductively connected to the first strobe control circuit, a first trigger circuit conductively connected to the first strobe control circuit and a first flash tube conductively connected to the first charging power supply circuit and the first trigger circuit;

an alternate flash mode interconnect line having a first end and a second end, the first end of the alternate flash mode interconnect line conductively connected to the first strobe control circuit;

a synchronous flash mode interconnect line having a first end and a second end, the first end of the synchronous flash mode interconnect line conductively connected to the first strobe control circuit; and a second strobe light including a second strobe control circuit conductively connectable to the power source, a second power input conductively connected to the control circuit, a second trigger input conductively connected to the control circuit and the second strobe control circuit, a second charging power supply circuit conductively connected to the second strobe control circuit, a second trigger circuit conductively connected to the second strobe control circuit and a second flash tube conductively connected to the second charging power supply circuit and the second trigger circuit, the second end of the alternate flash mode interconnect line conductively connected to the second strobe control circuit and the second end of the synchronous flash mode interconnect line conductively connected to the second strobe control circuit.

4. A visual alert system connectable to a power source comprising:

a first strobe light including a first strobe control circuit conductively connectable to the power source, a first charging power supply circuit conductively connected to the first strobe control circuit, a first trigger circuit conductively connected to the first strobe control circuit, a first flash tube conductively connected to the first charging power supply circuit and the first trigger circuit;

a second strobe light conductively connected to the first strobe light, the second strobe light including a second strobe control circuit conductively connectable to the power source, a second charging power supply circuit conductively connected to the second strobe control circuit, a second trigger circuit conductively connected to the second strobe control circuit, a second flash tube conductively connected to the second charging power supply circuit and the second trigger circuit;

an alternate flash mode interconnect line, a first end of the alternate flash mode interconnect line conductively connected to the first strobe control circuit and a second end of the alternate flash mode interconnect line conductively connectable to the second strobe control circuit; and a synchronous flash mode interconnect line, a first end of the synchronous flash mode interconnect line conductively connected to the first strobe control circuit and a second end of the synchronous flash mode interconnect line conductively connectable to the second strobe control circuit.

* * * * *